United States Patent [19]
Ohguchi

[11] Patent Number: 5,589,884
[45] Date of Patent: Dec. 31, 1996

[54] ADAPTIVE QUANTIZATION CONTROLLED BY SCENE CHANGE DETECTION

[75] Inventor: Yuji Ohguchi, Tsurugashima, Japan

[73] Assignee: Toko Kabushiki Kaisha, Tokyo-to, Japan

[21] Appl. No.: 316,348

[22] Filed: Sep. 30, 1994

[30] Foreign Application Priority Data

Oct. 1, 1993 [JP] Japan .................................. 5-269525

[51] Int. Cl.$^6$ .................................................. H04N 7/32
[52] U.S. Cl. .......................................... 348/405; 348/700
[58] Field of Search ...................................... 348/405, 419, 348/700, 701, 702, 396, 393, 391, 390, 384, 155, 154, 152; 382/236, 107

[56] References Cited

U.S. PATENT DOCUMENTS

| | | | |
|---|---|---|---|
| 4,500,911 | 2/1985 | Ninomiya et al. | 348/620 |
| 4,679,077 | 7/1987 | Yuasa et al. | 348/154 |
| 5,223,949 | 6/1993 | Honjo | 358/426 |
| 5,265,180 | 11/1993 | Golin | 382/236 |
| 5,325,203 | 6/1994 | Nojima et al. | 348/607 |
| 5,398,078 | 3/1995 | Masuda et al. | 348/699 |
| 5,455,561 | 10/1995 | Brown | 340/541 |
| 5,461,679 | 10/1995 | Normile et al. | 382/304 |

*Primary Examiner*—Tommy P. Chin
*Assistant Examiner*—Bryan S. Tung
*Attorney, Agent, or Firm*—Cushman Darby & Cushman Intellectual Property Group of Pillsbury Madison & Sutro, LLP

[57] ABSTRACT

A picture transmission system for compressing picture information to transmit compressed picture information is provided. The picture transmission system includes, on the transmitter side, circuitry for realizing scene change detecting function. This circuitry comprises a buffer memory for storing picture signal of one frame to output it in order of luminance signal Y, and chrominance signals $C_B$, $C_R$; a frame memory for storing picture signal of the former frame delivered from the buffer memory; a subtracter for performing, every corresponding pixels, subtractive operation between picture signal of one frame inputted from the buffer memory and the picture signal of the former frame read out from the frame memory to take out value of difference; a numeric value converter for binarizing the value of difference with a threshold value set in advance being as boundary; a counter for counting the number of one values of the binarized values to store the count value; a CPU for calculating change rate of picture on the basis of the count value read out from the counter; and a coding controller for converting the numeric value calculated by the CPU into a control signal in accordance with a function set in advance to control quantization level of the video encoder by the control signal.

11 Claims, 2 Drawing Sheets

ADAPTIVE QUANTIZATION CONTROLLED BY SCENE CHANGE DETECTION

BACKGROUND OF THE INVENTION

1. Field of the Invention

This invention relates to a picture transmission system for compressing picture information and for transmitting the compressed information, and more particularly to a picture transmission system for performing a scene change detection to detect changes in a scene on the transmitter side.

2. Description of the Related Art

When compressing picture information and transmitting the compressed information, predictive coding over two frames is effective for pictures of successive frames that are extremely similar to each other. For example, inter-frame difference coding which encodes a difference between a current frame and the former frame is effective. On the other hand, when motion (movement) within a picture is great, intra-frame predictive coding (predictive coding within the same frame) is more suitable. In accordance with the coding system of the H.261 which is the picture coding standard of television conference and visual telephone of CCITT (Comite Consultatif International Telegraphique et Telephonique), there is employed a scheme in which plural coding systems are combined to suitably carry out coding, the coding systems being switched depending upon the state of picture.

When scenes change or different pictures are inserted, a scene change phenomenon may occur during the transmission of a picture, particularly where no correlation exists between a certain frame and the former frame. When scene change phenomenon is experienced, the coding mode automatically becomes INTRA-MODE (intra-frame correlation mode) in accordance with the coding system of the H.261 standard. Thus, the transmission state is temporarily switched to the coding transmission state of the entire picture using a quantized value at that time. As a result, the amount of data to be transmitted is remarkably increased and the transmission time is prolonged. For this reason, there was the problem that a portion of picture may be placed in freeze state, or the frequency of frame dropping (missing frames) may increase.

SUMMARY OF THE INVENTION

With the above in mind, an object of this invention is to provide a picture transmission system which can accurately detect the occurrence of scene change during picture transmission, thereby effectively suppressing the frequency of frame dropping. To achieve the above-mentioned object, in accordance with this invention, there is employed a scheme to set the relationship between the change rate of the picture (or the difference value between two change rates) and the quantization level of video encoder to an arbitrary function. By doing so, the occurrence of scene change at the time of transmission of the picture will be securely detected, and the quantization step will be momentarily coarse in the scene change to suppress the quantity of data generated to be coded.

Namely, in accordance with this invention, at every corresponding pixel, a picture signal of a certain frame is compared with a picture signal of the preceding frame to determine how many pixels having difference values exceeding a predetermined value are within one frame. Based on this determination, a change rate is calculated to judge whether or not a scene change has taken place. When a frame which is determined to have scene change is coded, the coding mode is set to INTRA-mode and the quantization step is temporarily coarse to reduce the quantity of data to be coded.

Further, a picture transmission system of this invention comprises a buffer memory adapted for storing a picture signal of one frame to output it in order of luminance signal Y, chrominance signals $C_B$, $C_R$; a frame memory for storing a picture signal of the former frame delivered from the buffer memory; a subtracter for performing, every corresponding pixels, subtractive operation between the picture signal of one frame inputted from the buffer memory and a picture signal of the former frame read out from the frame memory to take out a value of difference; a numeric value converter for allowing the value of difference to be binary number (hereinafter simply referred to as "binarize") with a threshold value set in advance being as boundary; a counter for counting the number of one values of the binarized values to store the count value; a CPU for calculating a change rate of picture on the basis of the count value read out from the counter; and a coding controller for converting the value of the change rate calculated by the CPU into a control signal in accordance with a function set in advance to control quantization level of a video encoder by the control signal.

BRIEF DESCRIPTION OF THE DRAWINGS

In the accompanying drawings.

DESCRIPTION OF THE PREFERRED EMBODIMENT

Figure 1:
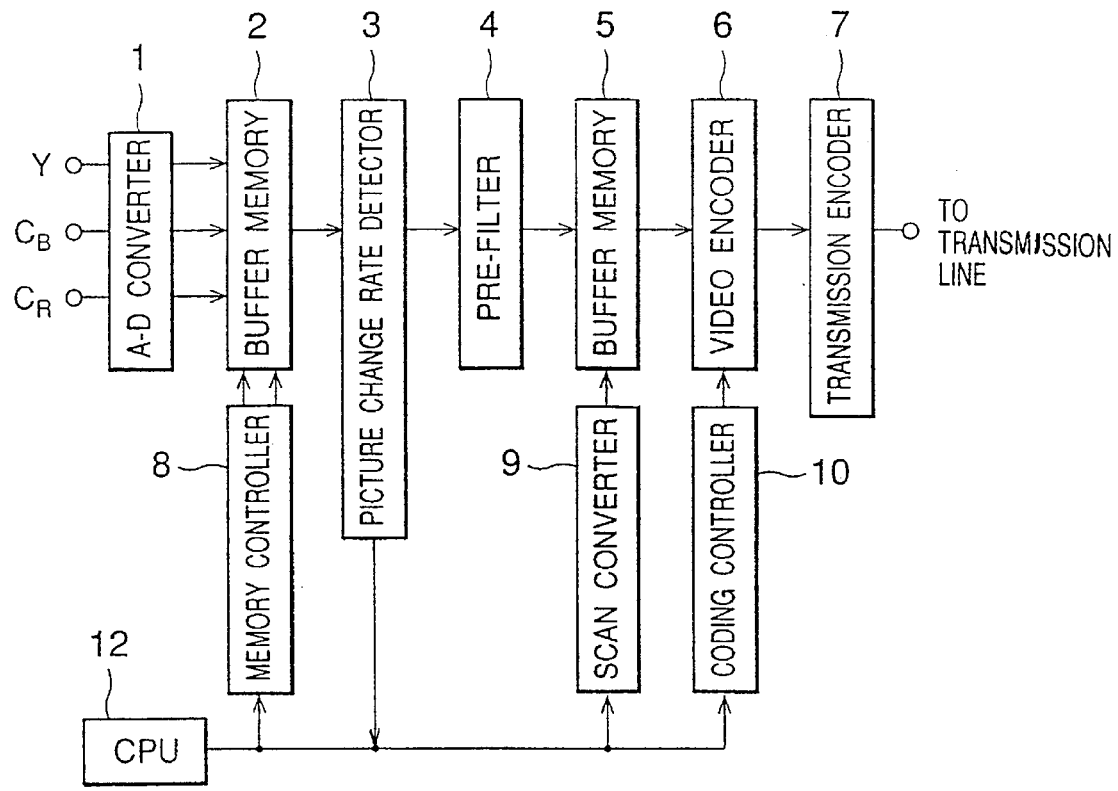
FIG. 1 is a block diagram of the transmitter side showing an embodiment of a picture transmission system according to this invention.

FIG. 1 is a block diagram showing an embodiment of the transmitter side of a picture transmission system according to this invention. In the figure, reference numeral 1 denotes an A-D converter for converting an analog video signal delivered from a video camera, etc., into a digital picture signal consisting of luminance signal Y and chrominance signals $C_B$, $C_R$. Picture signals output from memory 2 include every luminance signal and chrominance signals $C_B$, $C_R$. For instance, in buffer memory 2, the original picture signal of one frame is converted into a reduced picture signal having substantially one half the number of pixels of the original picture signal. For instance, a picture signal having 483 lines ×720 pixels is reduced to a picture signal having 240 lines ×352 pixels. Therefore, luminance signal Y, chrominance signals $C_B$, $C_R$ must undergo sequencing to be arranged in series. These picture signals are sent to a pre-filter 4 through a picture change rate detector 3 which will be described later. At pre-filter 4, these picture signals sequentially undergo a filtering processing. The picture signals are delivered by pre-filter 4 to a buffer memory 5 after being filter processed.

Each picture signal applied to the buffer memory 5 undergoes processing such that picture data are subjected to sequencing every fundamental block. After undergoing such sequencing, the picture signal is sent to a video encoder 6, where it undergoes picture compression-coding. Thereafter, the compression-coded signal is coded at a transmission encoder 7 so that it becomes a signal in conformity with a transmission line. The coded signal thus obtained is then sent from the transmission line.

In FIG. 1, reference numeral 8 denotes a memory controller for carrying out picture write and picture readout control of buffer memory 2, reference numeral 9 denotes a scan converter for controlling scanning conversion of buffer memory 5, and reference numeral 10 denotes a coding controller for controlling a quantization level at video encoder 6. The operations of these components designated at 8, 9, 10 are all controlled by CPU 12.

Figure 2:
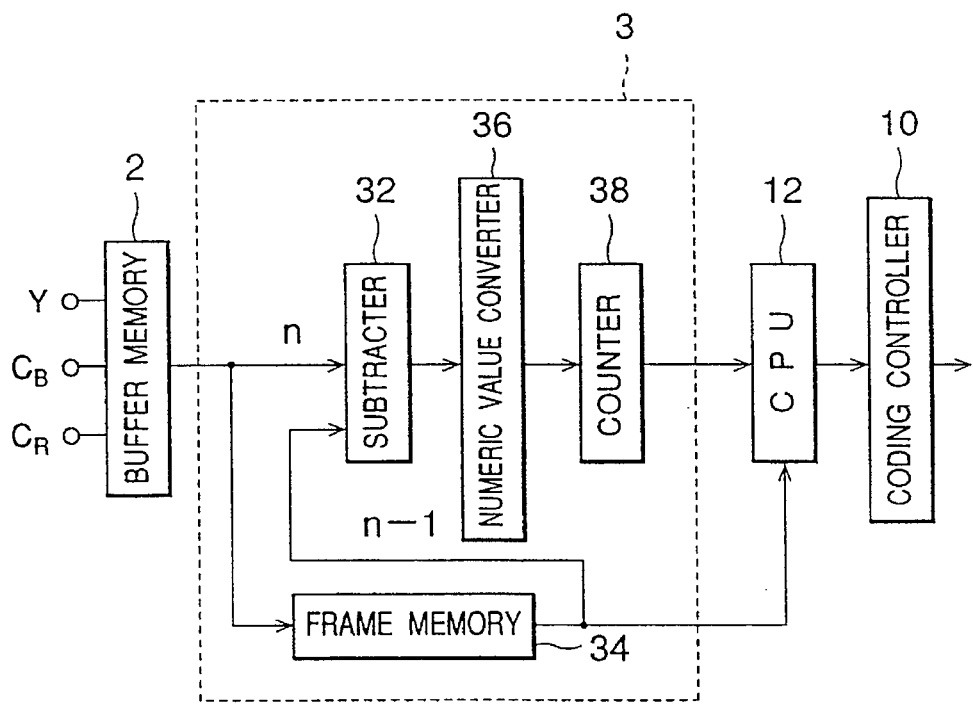
FIG. 2 is a block diagram of the essential part of the picture transmission system shown in FIG. 1.

FIG. 2 is a block diagram showing the picture change rate detector 3 and its peripheral configuration. The portion encircled by broken lines corresponds to picture change rate detector 3, and reference numerals 2, 10 and 12 respectively denote buffer memory, coding controller and CPU which have been already described.

Reference numeral 34 denotes a frame memory in which a picture signal is stored from one frame earlier. Subtracter 32 compares all corresponding pixels by performing a subtractive operation between the n-th frame which has been inputted from buffer memory 2 and the (n-1)-th frame which has been read out from frame memory 34 to determine the value of difference. Numeric value converter 36 comprised of ROM (Read Only Memory), etc., binarizes this value of difference into either "1" or "0" with a threshold value being set in advance as a boundary. Then, the number of binarized values representing differences is counted by one frame at counter 38 and is stored thereinto. It is sufficient that binarization and counting are carried out only with respect to luminance signal Y having large data quantity in the picture signal.

Figure 3:
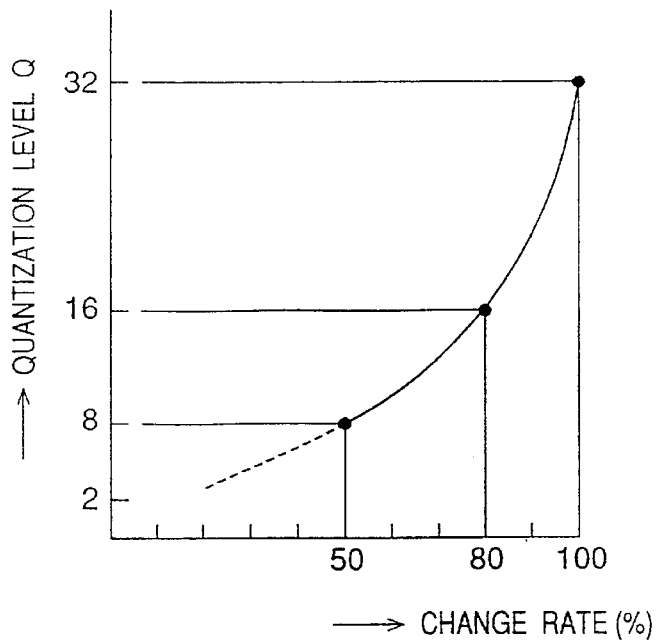
FIG. 3 is a correlation diagram showing an example of setting of the relationship between the change rate of picture and the quantization level.

CPU 12 reads out count value from counter 38 to calculate a change rate of picture indicating what percentage of the entire number of pixels is represented by this value, e.g., percentage of 352×240 pixels. Coding controller 10 converts the calculated change rate into a control signal corresponding thereto in accordance with a function, the function being set in advance to control quantization level Q of video encoder 6 by this control signal. FIG. 3 shows an example of a function curve of change rate and quantization level Q when the area where scene change is judged to have taken place is set to 50% or more.

In this case, when change rate is 50%, a control signal having a quantization level Q of 8 is outputted from coding controller 10 to video encoder 6. When change rate is 80%, a control signal having a quantization level Q of 16 is outputted from coding controller 10 to video encoder 6. The amount of information generated by coding at video encoder 6 is changed by the value of quantization level Q. Accordingly, as quantization level Q becomes greater, the quantization interval becomes broader. Thus, quantity of picture data generated is suppressed.

In the function curve of FIG. 3, when change rate is 50% or more, it is judged that scene change has taken place. Thus, quantity of picture data generated is suppressed. In the range where change rate is less than 50%, control is made by coding controller 10 so that quantization level Q becomes as small as possible. However, a scene change is not necessarily found to have taken place when the change rate is set to 50%. As such value, any value which can be considered to be optimum, such as, for example, 40% and 60%, etc. may be selected depending upon the kind of picture.

Meanwhile, there are instances where large values are repeated when change rates of pixels between successive frames are calculated, e.g., in a manner of 40%, 30%, 40%, 50%, 50%, 30%, 80%, 50%. Since it is judged with the previously described method that scene change has taken place when change rate is 50% or more, it will be judged in this case that four scene changes of 50%, 50%, 80%, 50% have taken place. Every time such a scene change takes place, the coding mode is set to INTRA mode. Thus, generation of data to be coded is suppressed. As a result, coarse coding more than required is continued, and deterioration of picture quality becomes conspicuous.

However, even when large values of change rates are successive, there are many instances where scene change does not take place in fact. It can be considered that scene change has taken place once in the above-mentioned example when change rate becomes equal to 80%.

In view of this, as means for judging whether or not a scene change takes place, a difference value between plural change rates may be used in place of change rate of pixels between only two successive frames. Namely, an approach is employed to calculate a difference between a certain change rate and the most recent former change rate to judge that scene change has taken place when the absolute value of the difference is, e.g., 40% or more. An example thereof will now be described.

It is now assumed that change rates of pixels between successive frames are continued in a manner of 40%, 30%, 40%, 50%, 50%, 30%, 80%, 50%.

With respect to the first 50%, since the change rate immediately before is 40%, the difference between two change rates is 50−40=10, and the absolute value of difference is also 10. Accordingly, it is judged that this is not scene change.

With respect to 80%, since change rate immediately before is 30%, difference between two change rates is 80−30=50, and absolute value of difference is also 50. It is judged that this is scene change.

An average value of plural change rates is employed in place of a method in which only one change rate is taken as change rate immediately before, thereby making it possible to improve accuracy of judgment to more degree. Namely, a difference between a certain change rate and an average value of plural change rates immediately before is calculated to judge that scene change has taken place when the absolute value thereof is, e.g., 30% or more. An example thereof will now be described. It is to be noted that while the number of change rates to be averaged may be 2 or more, average value of three change rates is taken as an example.

Similar to the previously described example, it is assumed that change rates of pixels between successive frames are continued in a manner of 40%, 30%, 40%, 50%, 50%, 30%, 80%, 50%.

Initially, with respect to the first 50%, the average value of 40%, 30%, 40% of three preceding consecutive change rates is calculated as about 37%. Accordingly, a difference between this average value and change rate of this time is 50−37=13, and the absolute value of difference is also 13. Thus, it is judged that this is not scene change.

In the case of the second 50%, the average value of 30%, 40%, 50% for three preceding consecutive change rates is calculated as 40%. Accordingly, a difference between this average value and change rate of this time is 50–40=10, and the absolute value of difference is also 10. Similarly, it is judged that this is not scene change.

In the case of 80%, the average value of 50%, 50%, 30% of three preceding consecutive change rates is calculated as about 43%. Accordingly, a difference between this average value and change rate of this time is 80–43=37, and the absolute value thereof is also 37. Thus, it is judged that this is scene change.

With respect to the third 50%, the average value of 50%, 30%, 80% of three preceding consecutive rates is calculated as about 53%. Accordingly, a difference between this average value and change rate of this time is 50–53=–3, and the absolute value of difference is 3. Thus, it is judged that this is not scene change.

In this embodiment, calculations such as difference values between plural change rates and/or average values of plural change rates are carried out by CPU 12 of FIG. 2.

Figure 4:
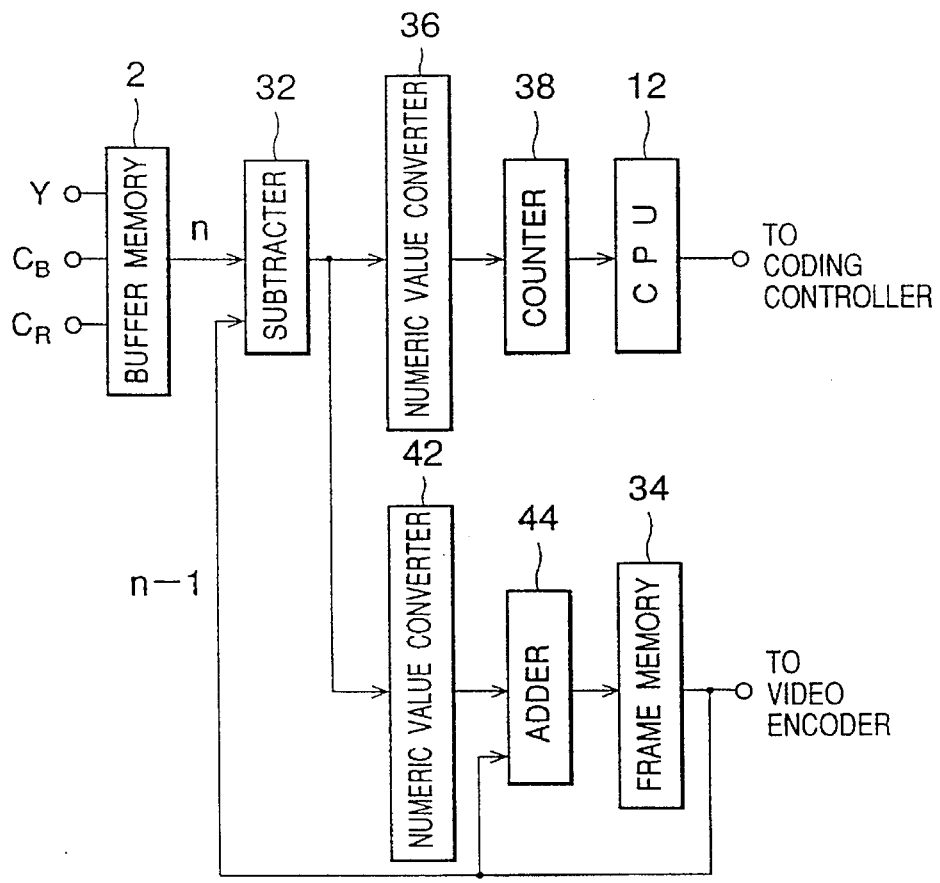
FIG. 4 is a block diagram of the essential part showing a second embodiment of a picture transmission system according to this invention.

FIG. 4 shows another embodiment of the picture transmission system of this invention. In this figure, picture change rate detector and the periphery thereof are illustrated by a block diagram similar to FIG. 2. In this embodiment, second numeric value converter 42 and adder 44 are additionally provided in addition to the above-described configuration, thus allowing the system to have noise reduction function.

The difference in pixels of picture signals in two frames that is calculated by subtracter 32 is converted into a numeric value in accordance with a function set in advance at numeric value converter 42. The function is set to generate a numeric value having a smaller value than the calculated difference, e.g., function value takes 0 when difference is 0, takes 0 when difference is 1, takes 1 when difference is 2, takes 2 when difference is 3, and takes 3 when difference is 5. Adder 44 adds the signal corresponding to the preceding picture signal of the former frame of the numeric value converted at numeric value converter 42. The added result is then stored into frame memory 34.

As a result, difference value between frames becomes smaller. Thus, noise of picture can be reduced.

In accordance with this invention, occurrence of scene change is securely detected to momentarily suppress quantity of data generated to be coded. Thus, occurrence of frame dropping can be effectively prevented. Further, not only the main part of picture change rate detector 3 can be used commonly for noise reduction, but also count value of counter within picture change rate detector 3 can be utilized also for determining coefficients of filtering at pre-filter 4. Accordingly, multi-functional picture transmission system can be obtained without allowing the circuit configuration to be of large scale.

What is claimed is:

1. A picture transmission system for digitizing, compression-encoding and transmitting a picture signal consisting of luminance signal and chrominance signals the system comprising:

a buffer memory storing a picture signal of a newest frame, output from the buffer memory including a luminance signal and chrominance signals which are characteristic of the stored picture signal;

a frame memory storing a picture signal of a most recent former frame delivered from the buffer memory;

a subtracter determining differences between corresponding pixels represented by the picture signal of the newest frame inputted from the buffer memory and the picture signal of the most recent former frame read out from the frame memory;

a numeric value converter comparing the differences between the corresponding pixels with a predetermined threshold value;

a calculating device calculating a number of differences exceeding the predetermined threshold value;

a processor calculating a picture change rate for the newest frame based on the number of differences calculated by the calculating device, and calculating a difference between a plurality of picture change rates including the newest picture change rate; and a coding controller for generating a control signal based on the difference calculated by the processor, the control signal being generated in accordance with a predetermined function to control a quantization level of a video encoder.

2. A picture transmission system as set forth in claim 1, wherein the difference between the plurality of picture change rates calculated by the processor is the difference between the picture change rates of the newest frame and the most recent former frame.

3. A picture transmission system as set forth in claim 1, wherein the processor further calculates a second difference that is used by the coding controller to generate the control signal, the difference between the plurality of picture change rates calculated by the processor being the difference between the picture change rate of the newest frame and the averaged value of the picture change rates of the plural frames preceding the newest frame.

4. A picture transmission system as set forth in claim 1, wherein the processor is central processing unit (CPU).

5. A picture transmission system as set forth in claim 1, wherein the calculating device stores a count value representing the number of differences exceeding the predetermined threshold value.

6. A picture transmission system as set forth in claim 1, wherein the subtracter determines differences by performing a subtractive operation.

7. A picture transmission system as set forth in claim 1, wherein the processor calculates the difference between the plurality of picture change rates on the basis of the number of differences calculated by the calculating device.

8. A picture transmission system as set forth in claim 1, wherein the subtracter determines differences between a single pixel represented by the picture signal of one frame inputted from the buffer memory and the picture signal of the former frame read out from the frame memory.

9. A picture transmission system as set forth in claim 1, wherein the predetermined function used to control the quantization level of the video encoder relates the quantization level to the picture change rate.

10. A picture transmission system as set forth in claim 2, wherein the processor calculates an absolute value of the difference between the plurality of picture change rates including the newest picture change rate, and the coding controller generates the control signal based on the absolute value.

11. A picture transmission system as set forth in claim 2, wherein the processor calculates an absolute value of the difference between the picture change rates of the newest frame and the most recent former frame, and the coding controller generates the control signal based on the absolute value.

* * * * *